July 2, 1968  F. R. QUINN  3,391,319
CONTROL SYSTEM FOR AN ALTERNATING CURRENT MOTOR
Original Filed Feb. 23, 1967  2 Sheets-Sheet 1
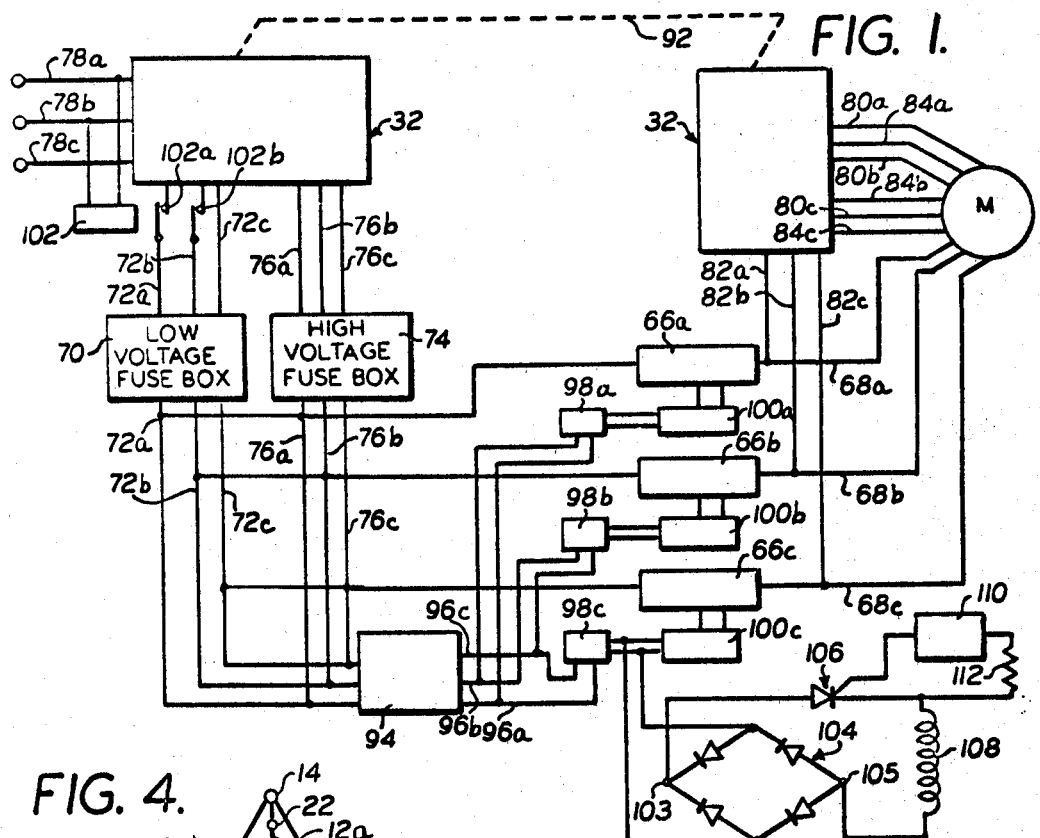
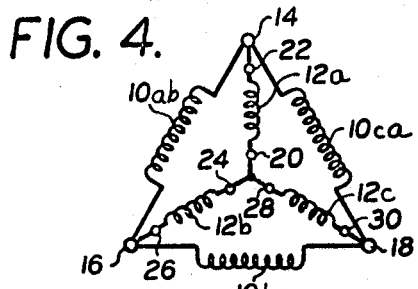
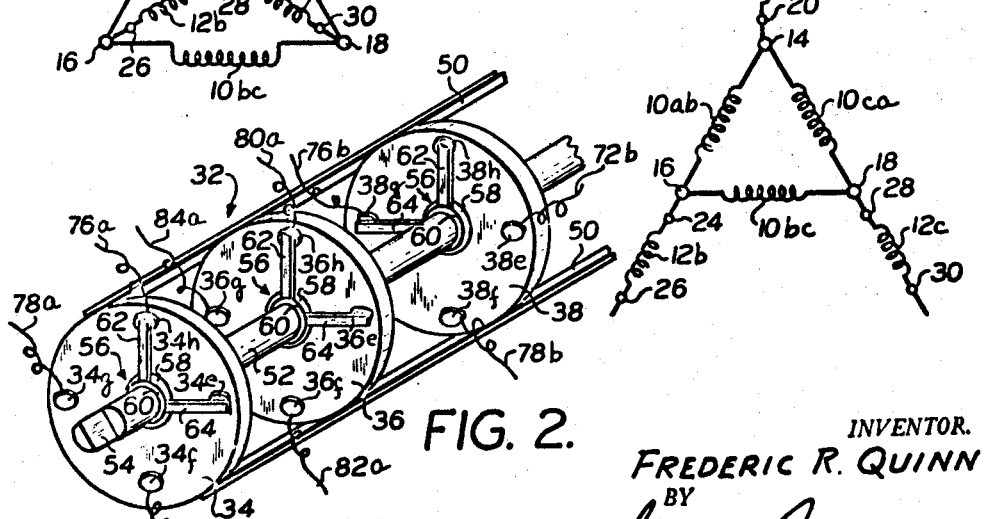
INVENTOR.
FREDERIC R. QUINN
BY
Irving Seidman
ATTORNEY

United States Patent Office 3,391,319
Patented July 2, 1968

3,391,319
CONTROL SYSTEM FOR AN ALTERNATING CURRENT MOTOR
Frederic R. Quinn, Red Hook, N.Y., assignor to Zyrotron Industries, Inc., Red Hook, N.Y., a corporation of New York
Original application Feb. 23, 1967, Ser. No. 618,140. Divided and this application Aug. 16, 1967, Ser. No. 661,098
5 Claims. (Cl. 318—225)

ABSTRACT OF THE DISCLOSURE

A control system for an alternating current motor of the type having a field winding for each phase in which each field winding includes at least a first and a second field coil adapted to be connected in different circuit arrangements in accordance with the amplitude of the available source of potential. The control system includes switching means which is connected between the field coils and a source of potential for connecting the field coils in the different circuit arrangements to eliminate the need to internally rewire the motor. The switching means is further operable to connect different current limiting devices in the different circuit arrangements in accordance with the driving potential to protect the motor against overloads.

---

This application is a division of my copending application Ser. No. 618,140, filed on Feb. 23, 1967, entitled "Control System for an Alternating Current Motor."

This invention relates generally to a control system for operating an atlernating current motor, and, more particularly, pertains to a control system for operating a polyphase induction motor at any one of a plurality of different potentials.

Presently, it is common practice to design alternating current polyphase induction motors or machines so that the field coils which comprise the field winding of each phase may be connected in different circuit configurations. This arrangement provides a means for operating the motor with potential sources having different amplitudes. For example, the field windings of each phase may comprise two coils which may be connected in either series or parallel relationship with each other. Thus, when the motor is connected across a low potential source, such as 220 volts, the coils are connected in parallel. On the other hand, when the motor is connected across a relatively high source of potential, such as 440 volts, the coils are connented in series.

The above-noted field winding connections are usually made internally at the time the motor is installed at a particular site. However, it has been found that problems arise in those applications in which the motor installation is not to be permanent but the motor is to be used at different locations. These problems are due to the fact that the amplitude of the available source of potential may vary from location to location. This requires the reconnection of the field windings so the circuit configuration of the field windings corresponds to that required for the magnitude of the available potential source. Thus, each time the motor is moved from one locale to another, the services of a qualified electrician will be required to effect the desired change in the wiring of the field windings. Moreover, the machine will be useless until it has been rewired to adapt it for use at the particular location. Accordingly, it will be obvious that this procedure is extremely uneconomical, particularly when it is taken into consideration that the devices controlled by the motor will remain inoperative until the motor has been adapted for use at the available potential.

Accordingly, an object of the present invention is to provide a control system for a polyphase motor in which a single device is utilized to quickly adapt the motor for operation at different potentials.

Another object of the present invention is to provide a control system for operating a polyphase motor at different potentials which may be positioned at a location which is remote from the motor.

A further object of the present invention is to provide a control system of the type described which is simple in construction and reliable in operation.

Another object of the invention is the provision of a control system for a polyphase motor which includes appropriate overload protection in accordance with the potential with which the motor is connected for operation.

In furtherance of the above objects, the control system of the present invention includes field switching means which is connected between a source of potential and the field coils of each field winding of a polyphase motor for switching the field coils between at least first and second circuit arrangements. The control system further includes starting means connected between the source of potential and the field windings. The starting means is operable to connect the motor with the source of potential and to apply a starting potential to the motor to initiate rotation of the rotor of the motor.

The control system of the present invention further includes a first and a second set of current limiting devices to prevent excessive current flow through the field windings. Each set of current limiting devices has a different rating so that the first set of current limiting devices will allow one value of current to flow through the field windings and the second set of current limiting devices will allow a different value of current to flow through the field windings. The first and second sets of current limiting devices are connected to the field switching means. The field switching means is operable to connect one set of current limiting devices in series with the field windings when the field coils are connected in the first circuit arrangement and to connect the other set of current limiting devices in series with the field windings when the field coils are connected in the second circuit arrangement. Thus, the control system of the present invention provides overload protection in accordance with the capability of the motor.

Other features and advantages of the present invention will become more apparent from a consideration of the following detailed description when taken in conjunction with the accompanying drawings, in which:

FIG. 1 is a schematic block wiring diagram of a control system constructed according to the present invention;

FIG. 2 is a perspective view, with parts broken away, of the multi-wafer switch which is utilized to accomplish the field switching operation in the present invention;

FIG. 4 is a schematic circuit wiring diagram of the field windings when the switch of FIG. 2 connects the motor for low voltage operation; and FIG. 5 is a schematic circuit wiring diagram of the field windings of the motor when the switch shown in FIG. 2 connects the motor for operation with a high voltage potential source.

Figure 3:
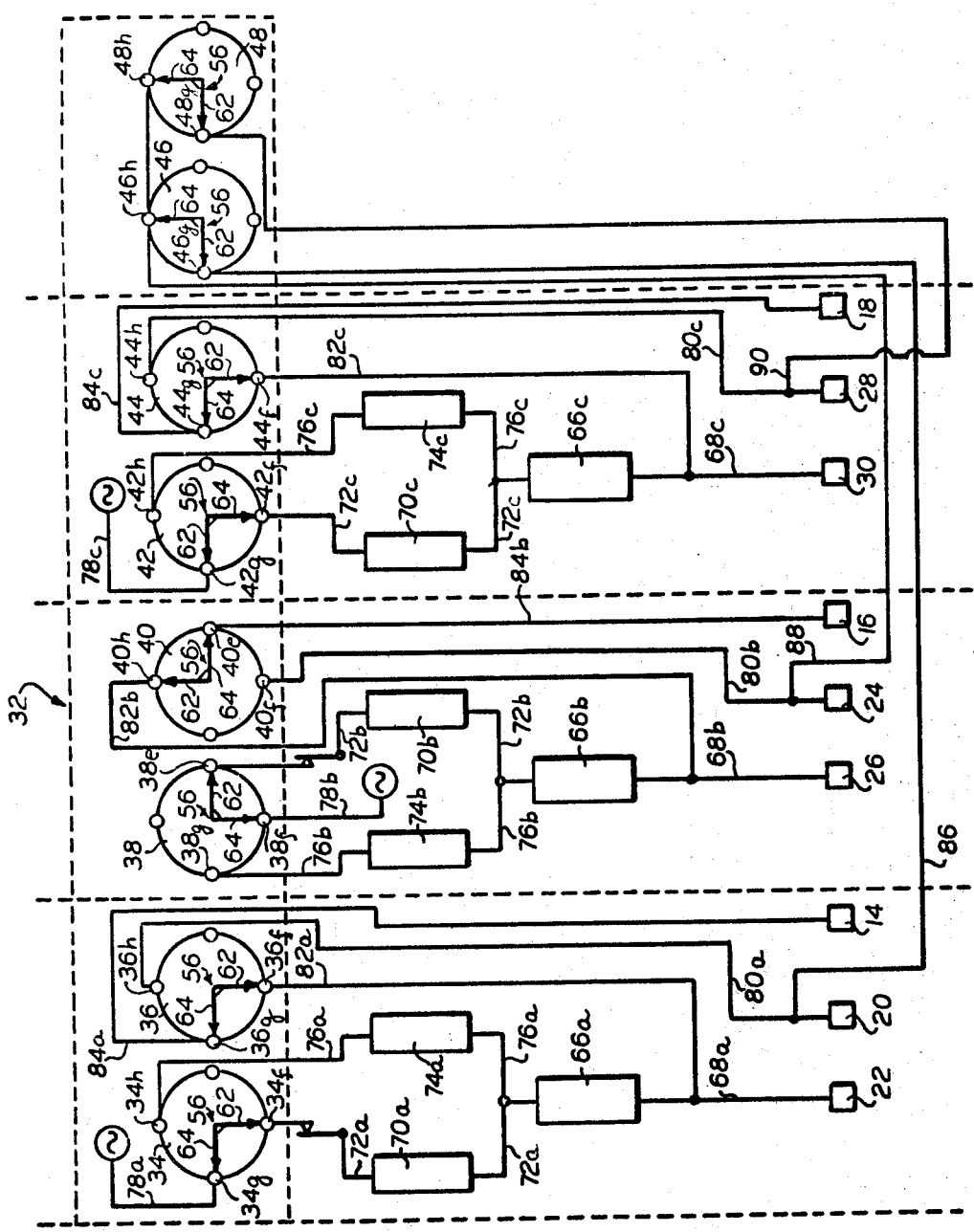
FIG. 3 is a schematic circuit winding diagram, partially in diagrammatic and block form, illustrating the connections between the field winding terminals and the wafers of the switch shown in FIG. 2.

As noted hereinabove, the control system of the present invention is adapted to be utilized with an alternating-current machine or motor. For purposes of illustration the present invention will be described in conjunction with a three-phase polyphase induction motor. However, this is for illustrative purposes only and is not to be interpreted as being a limitation on the present invention.

Motors of the type used in the illustrative example are usually designed to operate at at least two different potentials depending upon the circuit arrangement of the field coils which comprise the field windings of the machine. To be more specific, the field winding of each phase usually comprises a first and second coil which may be connected together in different configurations to adapt the motor for use with the particular available source of potential. For purposes of illustration, it will be assumed that the field windings of the motor under consideration may be connected in the configuration shown in FIG. 4 for operation at a low voltage (approximately 220 volts), or in the configuration shown in FIG. 5 for operation at a high voltage (approximately 440 volts). However, it is emphasized that these circuit configurations are for illustrative purposes only and are not to be interpreted as being a limitation on the present invention. That is, motors having field coils which may be connected in either series or parallel with each other to adapt the motor for use at high or low potentials, respectively, may be utilized instead of the configurations described. In other words, it is only necessary that the field windings comprise a plurality of field coils which may be connected in different circuit relationships.

For ease of reference, identical elements in each phase will be designated by the same reference numeral prefix. This will be followed by a letter suffix, a, b or c, which designates the particular phase or phases with which the element is associated. For example, field coil 12a designates coil 12 of phase "a," while field coil 12b designates the same coil of phase "b." Those reference numerals which are followed by a two letter suffix indicate that the particular element is associated with or connected between two phases. For example, field coil 10ab designates the coil 10 which is connected between phases "a" and "b."

As noted hereinabove, the field windings of the motor under consideration may be connected in the circuit configuration shown in FIG. 4 when the motor is to be operated at a low potential such as 220 volts, or in the circuit configuration shown in FIG 5 when the motor is to be operated at a high potential such as 440 volts. In the low voltage circuit configuration or arrangement shown in FIG. 4, the field windings comprise a field coil 10ab which is connected between phases "a" and "b," a field coil 10bc which is connected between phases "b" and "c" and a field coil 10ca which is connected between phase "c" and "a." More specifically, the coil 10ab is connected between end terminals 14 and 16; the coil 10bc is connected between end terminals 16 and 18; and the coil 10ca is connected between end terminals 18 and 14. The field coils 10ab, 10bc, and 10ca connected in a so-called delta circuit which is common to the circuit configurations of both FIG. 4 and FIG. 5.

The field windings further comprise a coil 12a having end terminals 20 and 22, a field coil 12b having end terminals 24 and 26, and a field coil 12c having end terminals 28 and 30. In the low voltage connection of FIG. 4, the coils 12a, 12b, and 12c are connected together in a so-called Y-connection. That is, the end terminals 20, 24 and 28 of the respective field coils 12a, 12b and 12c are connected together. On the other hand, the end terminals 22, 26 and 30 are respectively connected to the terminals 14, 16 and 18 of the coils 10ab–10ca.

For the high voltage connection shown in FIG. 5 the terminals 20, 24 and 28 of the respective field coils 12a, 12b and 12c are connected to the respective terminals 14, 16 and 18 of the field coil 10ab–10ca. The unconnected terminals 22, 26 and 30 of the respective field coils 12a, 12b and 12c are connected respectively to the individual phases of a three-phase source of potential, as noted in detail hereinbelow.

In accordance with a feature of the present invention, a field switch, designated generally by the numeral 32 (FIGS. 2 and 3) is provided which is adapted to automatically connect the field windings between the two circuit configurations shown in FIGS. 4 and 5. As shown in FIG. 2, the switch 32 is a so-called wafer-type switch and includes eight aligned wafer decks or wafers 34–48 fabricated from an insulating material (only decks 38 are shown in FIG. 2). The decks are maintained in spaced relationship to each other by opposed strips 50 which are connected to the peripheral wall of the respective wafer decks.

Each wafer deck is provided with four contacts which are spaced at 90° intervals about the front surface of the wafer. For purposes of reference, the terminals of the respective wafer decks are identified by a reference numeral prefix corresponding to the wafer deck designation and a letter suffix, e., f, g, or h, which designates that particular contact on the wafer deck. For example, the character 36e identifies the "e" contact on the wafer deck 36.

Extending through the center of the wafer decks 34–48 is a common shaft 52 which is rotatable with respect to the wafers. The front end of the shaft 52 is provided with a flat surface 54 which is adapted to non-rotatably receive a knob thereon to facilitate rotation of the shaft. Associated with each one of the wafer decks 34–48 is a respective brush 56. The brushes 56 are fabricated from a conducting material and include a ring 58 which is fixedly mounted on the shaft 52 and insulated therefrom by a bushing 60. Extending radially from the ring 58 are arms 62 and 64 which are spaced 90° apart from each other. The arms 62 and 64 are adapted to engage two contacts of the associated wafer deck to electrically connect the two contacts together.

The respective brushes 56 are rotatable with the shaft 52. Additionally, the switch 32 is of the snap-action type in which the shaft 52 is adapted to be rotated through 90° intervals in either direction. In other words, when the operator begins to rotate the shaft 52, the shaft will quickly advance 90°. It therefore will be obvious that for each rotation of the shaft 52, the brushes 56 will advance one contact. For example, when the shaft 52 is rotated clockwise from the position illustrated in FIG. 2, the arm 64 quickly will advance 90° from the contact 34e and engage the contact 34f. The arm 62 of the brush 56 will similarly advance one contact and engage the contact 34e. Thus contacts 34f and 34e will be connected together by the brush 56. In a like manner, the contacts 38h and 38e of the wafer deck 38 will be connected together by the brush 56 associated with this wafer deck. This snap-action type of construction is conventional and is well known in the art.

FIG. 3 illustrates the connection between the contacts of the field switch 32 and the field windings of the motor. In order to clarify the circuit connections only the terminals of the field coils have been shown in this diagram, it being understood that the appropriate field coils are connected between these terminals as indicated in either FIG. 4 or FIG. 5. As an illustration, it is to be understood that the field coil 12a is connected between the terminals 22 and 20 shown in FIG. 3.

Thus, referring to phase "a," the terminal 22 is connected to the output side of a starting switch 66a by a lead 68a. The input side of the switch 66a is connected to the contact 34f of the wafer deck 34, through a low voltage fuse 70a by a lead 72a. The contact 34h is also connected to the input side of the starting switch 66a through a high voltage fuse 74a by a lead 76a. The terminal 34g is connected to phase "a" of a three-phase source of potential by the lead 78a.

The terminal 20 of the field coil 12a is connected to the contact 36h of the wafer deck 36 by a lead 80a. Contact 36f is connected to terminal 22 of the field coil 12a by a lead 82a. Contact 36g is connected to terminal 14 of field coils 10ca and 10ab by a lead 84a.

Referring to the connections of phase "b," terminal 26 of the field coil 12b is connected to the output side of a starting switch 66b by a lead 68b. The input side of the switch 66b is connected to contact 38e of the wafer deck 38, through a low voltage fuse 70b by a lead 72g. The input side of the switch 66b is also connected to the terminal 38e, through a high voltage fuse 74b by a lead 76b. Phase "b" of the three-phase source of potential is connected to the terminal 38f by a lead 78b.

Terminal 24 of the field coil 12b is connected to contact 40f of wafer deck 40 by a lead 80b. Terminal 40h is connected to the lead 68b by a lead 82b. Additionally, contact 40e is connected to terminal 16 of field windings 10ab and 10bc by a lead 84b.

The field coil 12c is connected to the wafer decks 42 and 44 in a manner similar to the connection of the field coils 12a and 12b. More particularly, terminal 30 of the field coil 12c is connected to the output side of switch 66c by a lead 68c. The input side of the switch 66c is connected to the contact 42f of the wafer deck 42, through a low voltage fuse 70c, by a lead 72c. The input side of the switch 66c is also connected to the contact 42h, through a high voltage fuse 74c by a lead 76c. The contact 42g is connected to phase "c" of the three-phase supply by a lead 78c.

Terminal 28 of the field coil 12c is connected to contact 44h of the wafer deck 44 by a lead 80c. The contact 44f is connected to the lead 68c by a lead 82c. Connected to the contact 44g by a lead 84c is the terminal 18 of the field coils 10bc and 10ca.

A lead 86 connects the lead 80a with contact 46g of the wafer deck 46. Lead 80b is connected to the contact 46h and the contact 48h of the wafer decks 46 and 48, respectively. Additionally, the lead 80c is connected to the terminal 48g by a lead 90.

Although respective high voltage and low voltage fuses have been referred to hereinabove to provide overload protection for the motor which is to be used in conjunction with the control system of the present invention, it is to be noted that this is by way of illustration only and is not to be interpreted as being a limitation on the present invention. That is, any overload protection devices such as circuit breakers or the like may be utilized instead of the fuses 70a–70c and 74a–74c.

In practice, the starting switches 66a–66c are solid state switches which perform the function of a single-pole single-throw switch. As noted hereinbelow, the switches 66a–66c may take the form of a switch designated by the reference numeral 12 in my copending application Ser. No. 584,602, filed on Oct. 5, 1966, entitled "Condition Responsive Switch." Alternatively, the switches 66a–66c may take the form of the switch designated by the reference numeral 35 in my copending application Ser. No. 588,887, filed Oct. 24, 1966, entitled "Solid State Control System Pilot for Light Fuel Burner."

FIG. 3 illustrates the relationship of the arms 62 and 64 of the respective brushes 56 to the associated wafer deck for any one position of the shaft 52. For example, when the arms 62 and 64 of the brush 56 associated with the wafer deck 34 connect together the contacts 34f and 34g, the arms 62 and 64 of the brush 56 associated with the wafer deck 38 connect together the contacts 38e and 38f. Moreover, the angular relationship between each one of the brushes 56 will be maintained because each brush is fixedly mounted on the shaft 52.

For the position of the brushes 56 shown in FIG. 3 the field coils will be connected in the circuit configuration illustrated in FIG. 4. To be more specific, terminal 22 of field coil 12a will be connected to terminal 14 of the field coils 10ab and 10ca by the leads 68a and 82a, contact 36f, brush 56, contact 36g and lead 84a. Phase "a" of the three-phase source of potential will be connected to the junction of leads 68a and 82a and, therefore to the field winding terminals 22 and 14 via lead 78a, the connections on wafer deck 34, and through fuse 70a and switch 66a via the lead 72a. Similar connections will be established for phases "b" and "c." That is, terminal 26 of the field coil 12b will be connected to terminal 16 of the field coils 10ab and 10bc and terminal 30 of field coil 12c will be connected to terminal 18 of field coils 10bc and 10ca. Moreover, phases "b" and "c" of the voltage supply will be connected to the respective terminals 26, 16 and 30, 18.

Additionally, the terminals 20, 24 and 28 of the respective field coils 12a, 12b, and 12c will be connected together via the lead 86, 88 and 90 and the connections on the wafer decks 46 and 48. For example, the terminal 28 of the field coil 12c will be connected to the terminal 24 of the field coil 12b via the lead 90, contact 48g, the brush 56 associated with the wafer deck 48, the contact 48h, and the lead 88.

When it is desired to reconnect the field winding of the motor to adapt the motor for use with a high voltage source (FIG. 5), the shaft 52 is rotated through one quarter of a revolution in the clockwise direction. Accordingly, each one of the respective brushes 56 will advance one contact in the clockwise direction. Thus, for example, the brush 56 associated with the wafer deck 34 will now engage and connect together contacts 34g and 34h. On the other hand, the brush 56 associated with the wafer deck 38 will now connect together contacts 38f and 38g.

For this high voltage orientation of the field switch 32, phase "a" of the three-phase source of potential will be connected to the terminal 22 of the field coil 12a through the circuit comprising the lead 78a, contacts 34g and 34h and the brush 56 associated with the wafer deck 34, lead 76a, high voltage fuse 74a, switch 66a and the lead 68a. Additionally, the terminal 20 of the field coil 12a and the terminal 14 of the field coils 10ab and 10ca will be connected together (as hown in FIG. 5) via the lead 80a, contact 36h brush 56 associated with the wafer deck 36, contact 36g and lead 84a. The connection between terminals 22 of the field coil 12a and the terminal 14 of the delta connection will be broken since the brush 56 associated with the wafer deck 36 is no longer in engagement with contact 36f. Similar comments apply to the connections of the phases "b" and "c." In other words, if it is assumed that the brushes 56 associated with the wafer decks 38–48 have advanced one contact, it will be obvious that the field coils 12b and 12c will be connected to the respective terminals 16 and 18 of the delta connected field coils in the manner indicated in FIG. 5.

Additionally, it is to be noted that the connection between the contacts 46g and 46h will be broken. Likewise, the connection between the contacts 48g and 48h will similarly be broken. Accordingly, the connection between the terminals 20, 24 and 28 of the respective field coils 12a, 12b, and 12c, will be broken.

When the shaft 52 is rotated through another quarter of a revolution thereby to move the arms of the respective brushes 56 through an arc of 180° with respect to the position shown in FIG. 3, the source of potential will be disconnected from the field windings. That is, the contact 34g which is connected to phase "b" of the three-phase source of potential and contact 42g which is connected to phase "c" of the three-phase source of potential will not be engaged by the brushes 56 associated with these contacts. Thus, the field windings will be de-energized.

When the shaft 52 is rotated through another quarter-turn, thereby advancing the arms of the brushes in FIG. 2, the contacts 34g, 38f and 42g which are connected to the respective phases of the source of potential will remain disengaged from the brushes 56 associated with these contacts. Hence, the field windings will remain de-energized.

On the other hand, when the shaft 52 is rotated through another quarter-turn thereby advancing the arms of the brushes 56 a full 360°, the brushes will again assume the position shown in FIG. 2 thereby energizing the field windings and connecting the field coils in their low voltage configuration of FIG. 4.

It is to be noted that the starting switches 66a, 66b and 66c are connected in series with the field windings and the source of potential. Accordingly, the starting switches are operable to connect and disconnect the source of potential and the field windings. If switches of the type shown in my aforementioned patent applications are utilized, the source of potential will be disconnected from the field windings when the semiconductor devices are non-conducting. On the other hand, when the semiconductor devices are conducting the source of potential will be connected with the field windings to energize the same.

The control system of the present invention, which is shown in FIG. 1, includes the field switch 32, as noted above. In order to clarify the circuit connections, the field switch 32 is illustrated as two blocks which are interconnected by the dashed line 92 to indicate that the elements operate as a unit. The motor containing the field windings is designated generally by the reference character M.

As shown in FIG. 1, the low voltage fuses 70a–70c may be contained within a low voltage fuse box 70. Similarly, the high voltage fuses 74a–74c may be received in a high voltage fuse box 74. Connected to the leads 72a, 76a of phase "a"; 72b, 76b of phase "b"; and 72c, 76c of phase "c," are the respective input terminals of a triple-pole single-throw switch 94. The switch 94 functions as a conventional on-off switch as will be apparent from a consideration of the description below. Connected to the output terminals of the switch 94 are leads 96a, 96b and 96c.

Connected across the leads 96a and 96b is the primary winding of a step-down transformer 98a. The secondary winding of the transformer 98a is connected to a control circuit 100a which controls the operation of the starting switch 66a. Similarly, connected across the leads 96b and 96c is the primary winding of a step-down transformer 98b. The secondary winding of the transformer 98b is connected to a control circuit 100b which, in turn, is connected to and controls the operation of the starting switch 66b. In a like manner, connected across the leads 96c and 96a is the primary winding of the step-down transformer 98c, the secondary winding of which is connected to a control circuit 100c. Similarly to the control circuits 100a and 100b, the control circuit 100c is connected to and controls the operation of the starting switch 66c.

As noted hereinabove, the switches 66a–66c may be of the semiconductor type which utilize normally non-conducting silicon controlled rectifiers or SCR's as shown in my copending application Ser. No. 588,887, or my copending application Ser. No. 584,602. Thus, the control circuit 100a, 100b, and 100c may take the form of the control circuit designated by the numeral 14 in the latter identified application. However, it is to be noted that this is by way of illustration only and that any semiconductor switch and control circuit therefor may be utilized in the present invention. In any case, the control circuits 100a–100c are operable, when they are energized to drive the SCR's into conduction to connect the field windings with the source of potential.

It should be noted, however, that it is preferable to utilize a silicon controlled rectifier switch as the respective starting switches 66a–66c for the following reason. The silicon controlled rectifiers present a substantial value of impedance when they are initially forward biased to conduct. This feature is inherent in their operation. In fact, there is a delay of approximately 5 cycles before the silicon controlled rectifiers change into their low-impedance or current conducting state. During the transient period, the rectifiers introduce a sufficient amount of resistance between the source of potential and the field windings so that they essentially act as a starting box for the motor M.

To be more specific, when it is desired to start the motor M it is conventional practice to insert a large resistance in series with the field windings until the motor M is brought up to its rated speed. By utilizing the silicon controlled rectifier switches noted in my aforementioned patent application, the silicon controlled rectifiers per se function as starting resistors to limit the potential across the field windings of the motor M until the motor speed has increased sufficiently so that the full rated potential may be applied to the motor.

The control system of the present invention further includes means for disconnecting a high voltage source of potential from the motor M when the switch 32 is in the low voltage position (i.e., when the field windings are connected in the configuration shown in FIG. 4). Accordingly, the winding of a relay 102 is connected across the leads 78a and 78b. Serially connected in the leads 72a and 72b are normally closed contacts 102a and 102b, respectively, of the relay winding 102. The relay winding 102 is adapted to be energized to open the contacts 102a and 102b when the potential of the source is in excess of approximately 300 volts. Accordingly, if the potential of the source is 440 volts and the switch 32 is in the low voltage position, the contacts 102a and 102b will open thereby disconnecting the circuit from the source of potential to protect the field windings from sudden overloads.

In operation, the switch 32 is set to the desired low voltage or high voltage position in accordance with the amplitude of the available source of potential. Accordingly, the low voltage fuses 70a–70c or the high voltage fuses 74a–74c will be serially connected with the field windings of the motor M in the manner noted hereinabove. The switches 66a–66c will remain in their high impedance or non-conducting state thereby disconnecting the motor M from the source of potential. However, when the switch 94 is closed, the control circuits 100a–100c will be energized to operate the respective switches 66a–66c to the low impedance or conducting state thereby to connect the motor M with the source of potential. As noted above, during the transient period during which the switches 66a–66c change to their low impedance state, the speed of the motor M will increase so that full rated potential may be applied to the motor.

When it is desired to disconnect the motor M from the source of potential, the switch 94 is opened. This action will de-energize the control circuits 100a–100c thereby causing the switches 66a–66c to return to their high impedance state. Thus, the motor may be turned on and off simply by operating the switch 94. Moreover, the switch 94 may be located at a place remote from the motor.

Accordingly, a control system for an alternating current induction motor has been provided which automatically connects the motor for operation at either a low voltage or a high voltage. Additionally, the control system of the present invention automatically provides overload protection for the motor in accordance with the amplitude of the source of potential used.

The present invention may be used advantageously in conjunction with a rivet gun apparatus of the type which is operated by a pressurized fluid. Conventionally, the fluid is maintained under pressure by a pump which is operated by a continuously energized motor, such as the motor M. Application of the fluid to the gun per se to operate the same is usually controlled by a solenoid-actuated valve which is serially connected in a fluid conduct which connects the pump with the gun. A switch on the gun controls the operation of the valve.

To be more specific, the gun apparatus includes a full-wave diode bridge rectifier 104 which is connected with the secondary winding of the transformer 98c. The bridge rectifier 104 includes a positive output terminal 103 and a negative output terminal 105. Connected to the positive terminal 103 of the bridge rectifier 104 is the anode electrode of a silicon controlled rectifier 106. The cathode electrode of the rectifier 106 is connected to the negative terminal 105 of the bridge 104 through a solenoid winding 108 which is adapted to open the solenoid valve (not shown) in the fluid conduit of the gun apparatus. The gate electrode of the silicon controlled rectifier 106 is connected to the cathode electrode through the rivet gun which includes a single-pole single-throw switch 110 and a resistor 112.

In operation, the motor M is connected across the source of potential in the manner noted above. The motor M operates the pump which places the fluid in the rivet gun apparatus system under pressure. When it is desired to operate the gun, the switch 110, which may be in the form of a trigger mounted on the gun, is closed. Accordingly, the gate electrode of the silicon controlled rectifier 106 is connected to the cathode electrode through the resistor 112 thereby causing the silicon controlled rectifier 106 to conduct. When the rectifier begins to conduct, the solenoid winding 108 will be energized to open the solenoid-actuated valve thereby to permit fluid to flow to the gun to operate the gun. When it is desired to stop the operation of the gun, the switch 110 is opened, thereby causing the silicon controlled rectifier 106 to cease conducting to re-energize the winding 108. Hence the control valve will close.

While a preferred embodiment of the present invention has been shown and described herein it will be obvious that numerous omissions, changes and additions may be made in such embodiment without departing from the spirit and scope of the invention. For example, the elements comprising the system of the present invention may be enclosed in a housing which is remotely located with respect to the motor. Moreover, the motor may be connected to the housing by a conventional plug-in cable to facilitate connections therebetween.

What is claimed is:

1. A field switch for use with a polyphase motor of the type in which the field winding of each phase comprises at least a first and second field coil for connecting the first and second field coils in a first or a second circuit configuration; said switch including a first, a second and a third terminal for each phase; first lead means for connecting a first coil of each field winding across the first and second terminals of a respective phase and for connecting the second coil of each field winding between said third terminals of respective phases to form a series loop of the second field coils; and connecting means connected to said first, second, third terminals of each phase for connecting together said first and third terminals when said connecting means is in a first position and for connecting together said second and third terminals when said switch is in a second position.

2. A switch as in claim 1, in which said connecting means includes means for connecting together said second terminals when said switch is in said first position.

3. A switch as in claim 1, in which said connecting means includes contact means for each phase, and second lead means for connecting said first, second and third terminals of each phase to the respective contact means; and first and second current limiting means for each phase serially connected between at least one of said first, second and third terminals and said contact means for limiting the current flowing through the field windings; said first current limiting means being operable to limit the current to a lower value than said second current limiting means; and third lead means connected to said contact means for connecting said contact means with a source of potential; whereby said third lead means are respectively connected to said one terminal through said first fuse means when said connecting means is in said first position and said third lead means are respectively connected to said one terminal through said second fuse means when said connecting means is in said second position.

4. A switch as in claim 3, in which said connecting means includes at least a first and a second wafer deck for each phase, each of said first and second wafer decks having a first, a second and a third terminal, said third lead means being connected to said first terminal of said first wafer deck, said first and second current limiting means being connected respectively to said second and third terminals of said first wafer deck said second lead means including a conductor for connecting said first terminal to said first contact on said second wafer deck, said second lead means further including respective conductors for connecting said second and third terminals to said second and third contacts on said second wafer deck, and respective brush means associated with said first and second wafer decks, said brush means being selectively operable to connect together a different pair of said contacts on each of said first and second wafer decks when the connecting means is respectively in the first and second positions.

5. A switch as in claim 4, and a common shaft extending through said wafer decks and fixedly mounting said brushes thereon, said shaft being adapted to be rotated through ninety degree intervals.

No references cited.

ORIS L. RADER, *Primary Examiner.*

G. Z. RUBINSON, *Assistant Examiner.*